Oct. 17, 1939.  J. A. SWEENEY  2,176,368
OPHTHALMIC MOUNTING
Filed Sept. 25, 1935
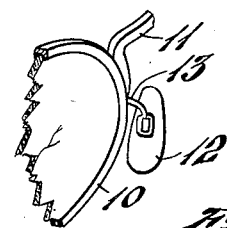
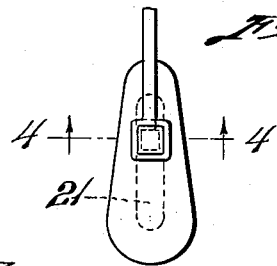
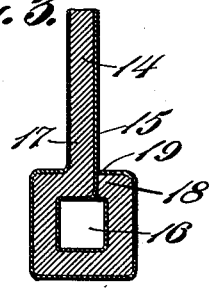
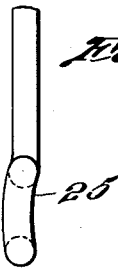
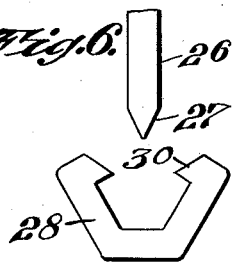
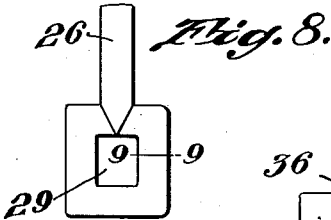
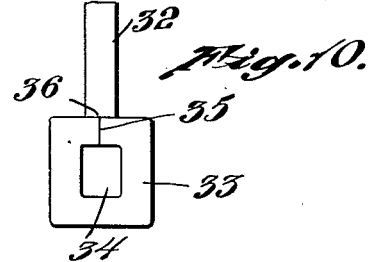
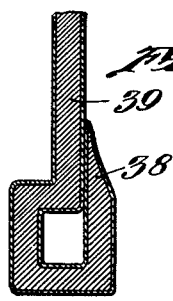
INVENTOR.
James A. Sweeney
BY Barlow & Barlow
ATTORNEYS.

Patented Oct. 17, 1939

2,176,368

UNITED STATES PATENT OFFICE 2,176,368

OPHTHALMIC MOUNTING

James A. Sweeney, Providence, R. I., assignor to Universal Optical Corporation, Providence, R. I., a corporation of Rhode Island Application September 25, 1935, Serial No. 42,045

1 Claim. (Cl. 88—48)

This invention relates to an ophthalmic mounting, more particularly the mounting of a nose pad, and this invention has for one of its objects the provision of a mounting of a nose pad so that it may be rocked to adjust itself to the face of the wearer, and yet be prevented from pivotal movement about its mounting as an axis.

Another object of the invention is to provide a mounting the wearing parts of which will be better protected from the corrosive action of the acids of the skin and thus better resist wear and maintain the desired shape which prevents rotative movement of the pad with reference to the arm about a horizontal pivotal axis.

Another object of the invention is the provision of a mounting arm which will have no pierced opening so as to expose an unplated portion of the surface for the corrosive action of the acids of the skin.

Another object of the invention is to provide an opening into which the stud extends the edges of which opening will be completely covered with a non-corrosive plating material so that the contacting surfaces between the stud and its arm will be better protected.

With these and other objects in view, the invention consists of certain novel features of construction, as will be more fully described, and particularly pointed out in the appended claim.

In the accompanying drawing:

Fig. 1 is a perspective view of a fragmental portion of a lens rim and bridge showing a pad and its mounting arm in its relation to the bridge and rim;

Fig. 2 is a rear view of the pad showing a fragmental portion of the arm as secured thereto;

Fig. 3 is a longitudinal sectional view of the arm;

Fig. 4 is a sectional view on line 4—4 of Figure 2;

Fig. 5 is a side elevation of the supporting arm showing the curvature thereof;

Fig. 6 is a plan view of one part of a modified form of arm;

Fig. 7 is a plan view of the other part of the arm of Figure 6;

Fig. 8 is a plan view of the parts of Figure 6 and Figure 7 assembled;

Fig. 9 is a section on line 9—9 of Figure 8;

Fig. 10 is a plan view of a different modification of arm;

Fig. 11 is a view similar to Figure 3 of a different modification showing an arm bent into shape.

In the use of ophthalmic mountings, it is desirable to provide a rockable nose pad so that the same may adjust itself to the face of the wearer. It is found in the use of a pad in which a stud extends from the pad through an opening in the supporting arm and which is made non-circular to fit in a corresponding non-circular opening in the arm so as to prevent rotation about the stud and axis, that the acids of the skin so affect the contacting parts of the stud and the non-plated edges of the opening in the arm as to cause an enlargement usually of the opening, or where a stud is not plated also a decrease of the size of stud by the wearing off of the corners to such an extent that the pad will rotate about the stud as an axis; and in order to preserve the arm so that the corrosion will not act thereon and to also preserve the stud so that no corrosion will occur, I have bent up a plated wire to provide an opening for the stud rather than cutting an opening in the arm to leave an exposed surface which is non-plated and which the acids of the skin will corrode; and I also plate the stud so that no corrosion will attack these contacting surfaces, and thus the desired shape and maintaining of the part against rotation about the stud as an axis is prevented; and the following is a more detailed description of the present embodiment of this invention, illustrating the preferred means by which these advantageous results may be accomplished:

With reference to the drawing, 10 designates a lens rim and 11 a bridge which connects two rims together. A nose pad 12 is supported at or adjacent the juncture of the bridge and rim by a supporting arm 13. This supporting arm 13 is of wire stock having a core 14 and a plate 15 covering its outer surface, which plate is of some precious or non-corrosive material, such as gold; and this arm 13 is doubled back upon itself and offset to provide a non-circular open loop 16, here shown as square, with the end 18 of this arm suitably secured along the shank 17 of the arm as at 19. This offset is at substantially right angles and of sufficient extent so as to provide the center of the opening 16 along the axial line of the shank or arm 13. By folding the plated wire arm in this manner, no unexposed base metal is present in the opening or anywhere along the arm for attack by the acids of the skin, but on the other hand, the entire contacting surface of the loop is covered with a non-corrosive plate to prevent such action.

The pad 12 is usually of a non-metallic material, such as Celluloid or zylonite, and is provided with a metal core 21 from the rear surface of which there extends a stud 22. This stud 22 is positioned through the opening 16 in the loop of the arm and is of square shape to correspond with the shape of the opening in the arm. The shape is non-circular so as to prevent rotation of the pad about the stud as an axis. This stud is is of such a size as to loosely fit in the arm and is upset to provide a head 23, at a point spaced from the rear surface of the pad sufficient to permit a rocking movement of the pad with reference to the arm, which rocking movement is somewhat restricted in one direction if desired or may occur in one direction more than the other as by the arcuate shape of the loop, as at 25 in Figure 5. This head may be removed for detaching the pad from the arm and substituting a fresh pad therefor, all without disturbing the arm and its position of adjustment to the face of the wearer.

By the arrangement just described, it will be seen that the plated surface of the stud contacts the plated surface of the arm so that the acids of the flesh will not cause corrosion along the contacting surfaces of these parts and thus the wearing action of the non-circular part is reduced; and while I have shown the wire as of a round cross-section, any cross-section, of course, may be used.

In Figures 6, 7, 8 and 9 there is shown a different construction of arm which consists of two parts, namely, the shank portion 26 tapered as at 27 and a looped portion 28 folded to provide an open square 29 with the ends of the wire 30 beveled sufficiently to receive the tapered point 27 of the shank 26, as shown in assembly in Figure 8, the construction being such that all cut surfaces such as 27 and 30 are unexposed, the plated surface 31 shown in the section in Figure 9 being alone exposed. In this modification I have shown a wire square in cross-section encircling a square opening to receive a stud of the same form as heretofore described.

In Figure 10, I have illustrated a different arm. In this view there is a shank 32 with a wire 33 formed in a loop having a square opening 34 with the ends of the wire 35 abutting and the shank 32 abutting the joint as at 36, whereby all of the unplated ends are concealed.

In Figure 11, a still different form is shown following somewhat the general scheme in Figure 3 with the end portion 38 reduced along a taper and extending along the shank 39 and securely soldered thereto instead of with an abutting end as shown in Figure 3.

By the arrangements here shown corrosion is reduced and wear minimized; if, however, the pad is desired to be removed, this may be accomplished by removing the head of the pad stud and supplying a fresh one.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

In an ophthalmic mounting, a nose pad support arm comprising a wire having a core of base metal and a plated coating of a relatively non-corrosive material thereon, said arm having a non-circular loop portion bent to cause its ends to abut at a plated portion with a flaring recess between the ends, and a shank portion tapered at its end to fit said recess, the plated coating at the edges of said flaring recess and tapered surface surrounding base metal and abutting to prevent exposure of the base metal when the shank and loop are assembled.

JAMES A. SWEENEY.